(12) United States Patent
Hicks et al.

(10) Patent No.: US 7,720,811 B2
(45) Date of Patent: *May 18, 2010

(54) SYNCHRONIZATION OF APPLICATION RULES ACROSS DATABASE INSTANCES

(75) Inventors: Scott D. Hicks, Underhill Center, VT (US); Victoria A. Locke, Fishkill, NY (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 11/838,430

(22) Filed: Aug. 14, 2007

(65) Prior Publication Data
US 2007/0294316 A1 Dec. 20, 2007

Related U.S. Application Data

(62) Division of application No. 10/898,108, filed on Jul. 22, 2004, now Pat. No. 7,318,067.

(51) Int. Cl.
G06F 7/00 (2006.01)
(52) U.S. Cl. ..................... 707/620; 707/614
(58) Field of Classification Search ................. 707/201, 707/204, 102
See application file for complete search history.

(56) References Cited

U.S. PATENT DOCUMENTS

| | | | |
|---|---|---|---|
| 5,295,222 A | 3/1994 | Wadhwa et al. | |
| 6,016,393 A | 1/2000 | White et al. | |
| 6,556,985 B1 | 4/2003 | Karch | |
| 6,601,076 B1 | 7/2003 | McCaw et al. | |
| 6,684,188 B1 | 1/2004 | Mitchell et al. | |
| 2002/0055939 A1 | 5/2002 | Nardone et al. | |
| 2002/0133509 A1 | 9/2002 | Johnston et al. | |
| 2003/0018778 A1 | 1/2003 | Martin et al. | |
| 2003/0153991 A1 | 8/2003 | Visser et al. | |
| 2003/0167286 A1 | 9/2003 | Yasuta | |
| 2003/0217096 A1 | 11/2003 | McKelvie et al. | |
| 2004/0006506 A1 | 1/2004 | Hoang | |
| 2004/0040025 A1* | 2/2004 | Lehtinen | 718/104 |
| 2009/0024652 A1* | 1/2009 | Thompson et al. | 707/102 |

* cited by examiner

*Primary Examiner*—Charles Rones
*Assistant Examiner*—Fariborz Khoshnoodi
(74) *Attorney, Agent, or Firm*—Schmeiser, Olsen & Watts; Anna L. Linne

(57) ABSTRACT

A method and system for synchronizing M application rules across N database instances. N and M are each at least 2. A rule synchronization agent is executed which updates N1 database instances with the M application rules and does not update a remaining N-N1 database instances with the M application rules if N1 is equal to N. N1 is at least 1. If N1 is less than N, then each of the remaining N-N1 database instances include a first and/or second characteristic. The first characteristic is that the remaining database instances include the M application rules upon initiation of the executing. The second characteristic is that the agent is unable to access the remaining database instance during the executing.

19 Claims, 8 Drawing Sheets

| BILLING YEAR | BILLING MONTH | LABOR START | LABOR END | BILLING START | BILLING END |
|---|---|---|---|---|---|
| ▽ 2004 | | | | | |
| | JANUARY | 11/22/2003 | 12/26/2003 | 11/22/2003 | 12/26/2003 |
| | FEBRUARY | 12/27/2003 | 01/23/2004 | 12/27/2003 | 01/23/2004 |
| | MARCH | 01/24/2004 | 02/20/2004 | 01/24/2004 | 02/20/2004 |
| | APRIL | 02/21/2004 | 03/26/2004 | 02/21/2004 | 03/26/2004 |
| | MAY | 03/27/2004 | 04/23/2004 | 03/27/2004 | 04/23/2004 |
| | JUNE | 04/24/2004 | 05/21/2004 | 04/24/2004 | 05/21/2004 |
| | JULY | 05/22/2004 | 06/25/2004 | 05/22/2004 | 06/25/2004 |
| | AUGUST | 06/26/2004 | 07/23/2004 | 06/26/2004 | 07/23/2004 |
| | SEPTEMBER | 07/24/2004 | 08/20/2004 | 07/24/2004 | 08/20/2004 |
| | OCTOBER | 08/21/2004 | 09/24/2004 | 08/21/2004 | 09/24/2004 |
| | NOVEMBER | 09/25/2004 | 10/22/2004 | 09/25/2004 | 10/22/2004 |
| | DECEMBER | 10/23/2004 | 11/19/2004 | 10/23/2004 | 11/19/2004 |
| ▽ 2003 | | | | | |
| | JANUARY | 11/23/2002 | 12/20/2002 | 11/23/2002 | 12/20/2002 |
| | FEBRUARY | 12/21/2002 | 01/24/2003 | 12/21/2002 | 01/24/2003 |
| | MARCH | 01/25/2003 | 02/21/2003 | 01/25/2003 | 02/21/2003 |

*FIG. 2B*

| MACHINE CLASS | MACHINE USAGES | OPERATING SYSTEMS | NETWORK CARD TYPES |
|---|---|---|---|
| LAPTOP | PRIMARY NOTES WORKSTATION, LAB/MANUFACTURING/TESTER | WINDOWS 95, WINDOWS 98, WINDOWS NT, WINDOWS 2000, WINDOWS XP, OS/2 LINUX | TOKEN RING, ETHERNET10, ETHERNET 100 |

*FIG. 2C*

SYNCHRONIZATION OF APPLICATION RULES ACROSS DATABASE INSTANCES

BACKGROUND OF THE INVENTION

1. Technical Field

The present invention relates to a method and system for synchronizing application rules across database instances.

2. Related Art

The updating of application rules in database instances is inefficient in the related art. Accordingly, there is a need for a more efficient method and system for updating application rules in database instances than currently exists in the related art.

SUMMARY OF THE INVENTION

The present invention provides a method for synchronizing M application rules across N database instances, wherein each application rule is associated with a software application and is a value of a parameter expressed as a function of one or more additional parameters, said method comprising:

executing a rule synchronization agent, wherein said executing comprises updating N1 database instances of the N database instances with the M application rules and not updating the remaining N-N1 database instances that remains if N1 is less than N, wherein M is at least 2, wherein N is at least 2, wherein N1 is at least 1, wherein if N1 is less than N then each of the remaining N-N1 database instances comprise at least one characteristic of a first characteristic and a second characteristic, wherein the first characteristic is that the remaining database instances comprise the M application rules upon initiation of said executing, and wherein the second characteristic is that the rule synchronization agent is unable to access the remaining N-N1 database instances during said executing.

The present invention advantageously provides a more efficient method and system for updating application rules in database instances than currently exists in the related art.

BRIEF DESCRIPTION OF THE DRAWINGS

FIGS. 2B and 2C depict additional examples of rules of a rules hierarchy, in accordance with embodiments of the present invention.

DETAILED DESCRIPTION OF THE INVENTION

Figure 1:
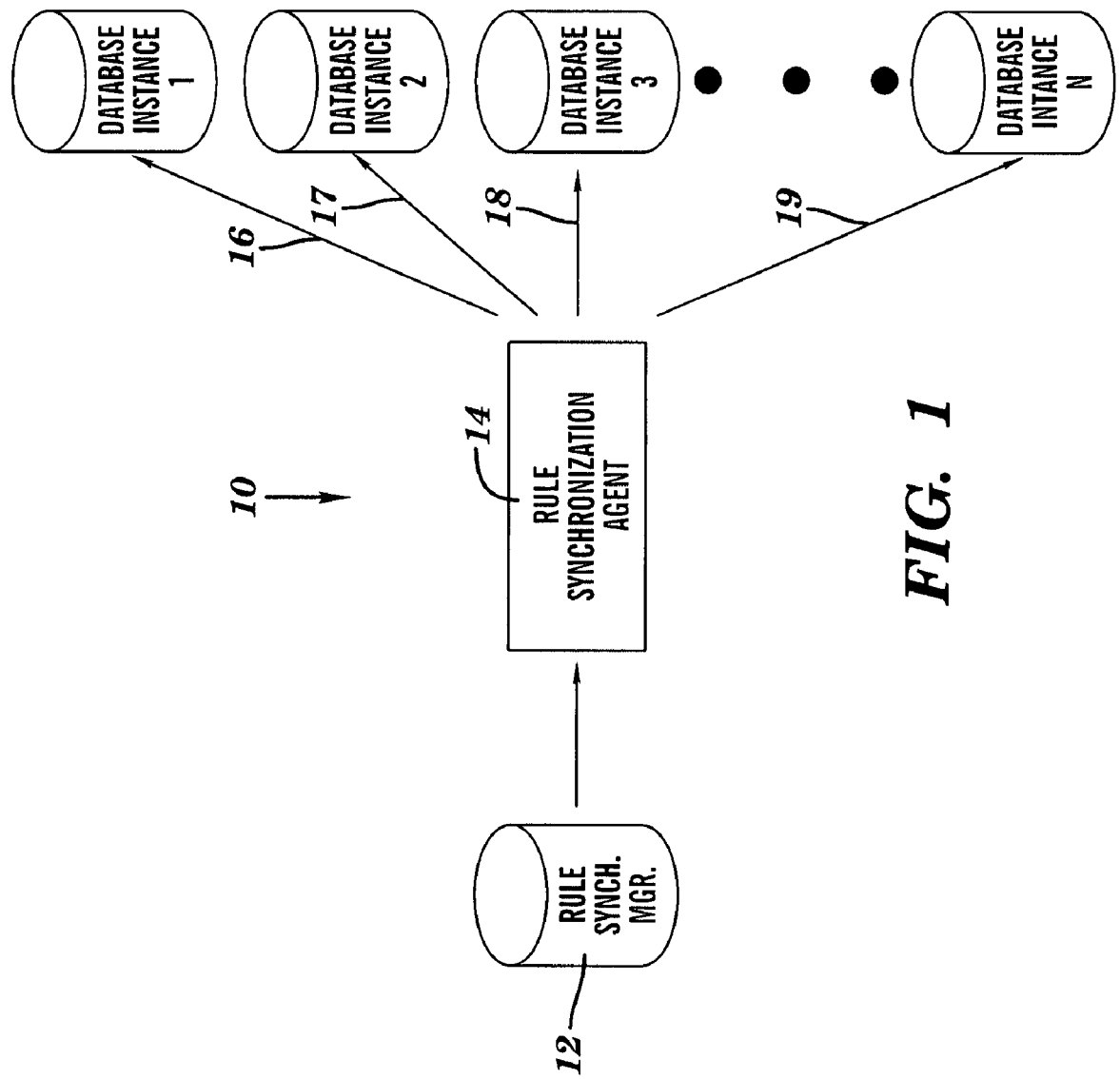
FIG. 1 depicts a system for managing an updating of database instances with application rules, in accordance with embodiments of the present invention.

FIG. 1 depicts a system 10 with for managing an updating of N database instances with application rules, in accordance with embodiments of the present invention. The system 10 includes a rule synchronization manager 12, a rule synchronization agent 14, and the N database instances, N is at least 2. The N database instances comprise database instance 1, database instance 2, database instance 3, . . . , database instance N. See FIG. 7, described infra, for a computer system that includes the system 10 of FIG. 1.

In FIG. 1, the rule synchronization manager 12 is a data structure that includes a database for storing or accessing "application rules" which are intended to each be placed and stored in each database instance of the N database instances. A "rule" is defined as a value of a parameter expressed as a function of one or more additional parameters. An "application rule" is defined as a rule associated with a software application (i.e., computer code or program). An application rule may relate to the software application in any manner. For example, the application rule may pertain to hardware and/or software supporting execution of the application. Application rules will be illustrated infra in conjunction with FIGS. 2A-2C. The application rules may be comprised by the data structure of the rule synchronization manager 12, or may alternatively exist outside of the rule synchronization manager 12. If existing outside of the rule synchronization manager 12, the application rules may reside in a single location (e.g., within a single database) or alternatively may be distributed within a plurality of locations (e.g., within a plurality of databases). The rule synchronization agent 14 may be comprised by the data structure of the rule synchronization manager 12, or may alternatively exist outside of the rule synchronization manager 12.

A database is defined as a repository in which data is stored in a structured format. Thus, a database includes data storage structures such as, inter alia, tables, files, etc. Each data storage structure has a characteristic structure in a structured format. For example, a table is organized into columns and rows. A column is also called a "field". The structured format of a table defines the fields, including the definition of each field, the data type of each field (e.g., integer, floating point, character, binary, etc.), and the maximum length or fixed length of each field (e.g., number of characters or bits, highest and lowest permitted integer values, etc.). As another example, a file may be organized into records. The structured format of a file defines the fields within the record, wherein the records may be fixed-length records or variable-length records.

The N database instances have a same structural design. The structural design that is the same for the N database instances is characterized by a defined set of data storage structures within each database instance. For example, the structural design may comprise a defined set of tables which includes a specification of the structured format of each table. Although the N database instances have a same structural design, the N database instances may comprise different data values within the framework of the same structural design.

As a first example of multiple database instances, the N database instances may each represent an organization and its members and/or employees in different geographic locations. For this first example, the database instance 1 may be a "Boston" database instance, the database instance 2 may be a "Chicago" database instance, the database instance 13 may be a "Denver" database instance, etc.

As a second example of multiple database instances, the N database instances may each represent a functional component of an organization. For this second example, the database instance 1 may be a "engineering design" database instance, the database instance 2 may be an "administration" database instance, the database instance 3 may be a "sales" database instance, etc.

As a third example of multiple database instances, the N database instances may each represent a project of an organization such as a medical research organization. For this third example for the case of a medical research organization, the database instance 1 may be an "coronary implant" database instance, the database instance 2 may be a "tumor growth tracker" database instance, the database instance may be a "blood lipid analyzer" database instance, etc.

The rule synchronization agent 14 is an "agent" adapted to update the N database instances which are stored in the rule synchronization manager 12. An "agent" is defined as a computer executable program or software that functions as a background process within the operating system environment. The agent can function concurrent with, and independent of, other software execution that is occurring within the operating system environment. Although the description herein describes the rule synchronization agent 14 as a single agent, all of the functionality described herein for the rule synchronization agent 14 may alternatively be performed, in general, by two or more of such rule synchronization agents working cooperatively with one another. The rule synchronization agent 14 communicates with database instances 1, 2, 3, . . . , N over communication links 16, 17, 18, . . . , 19, respectively.

Figure 2A:
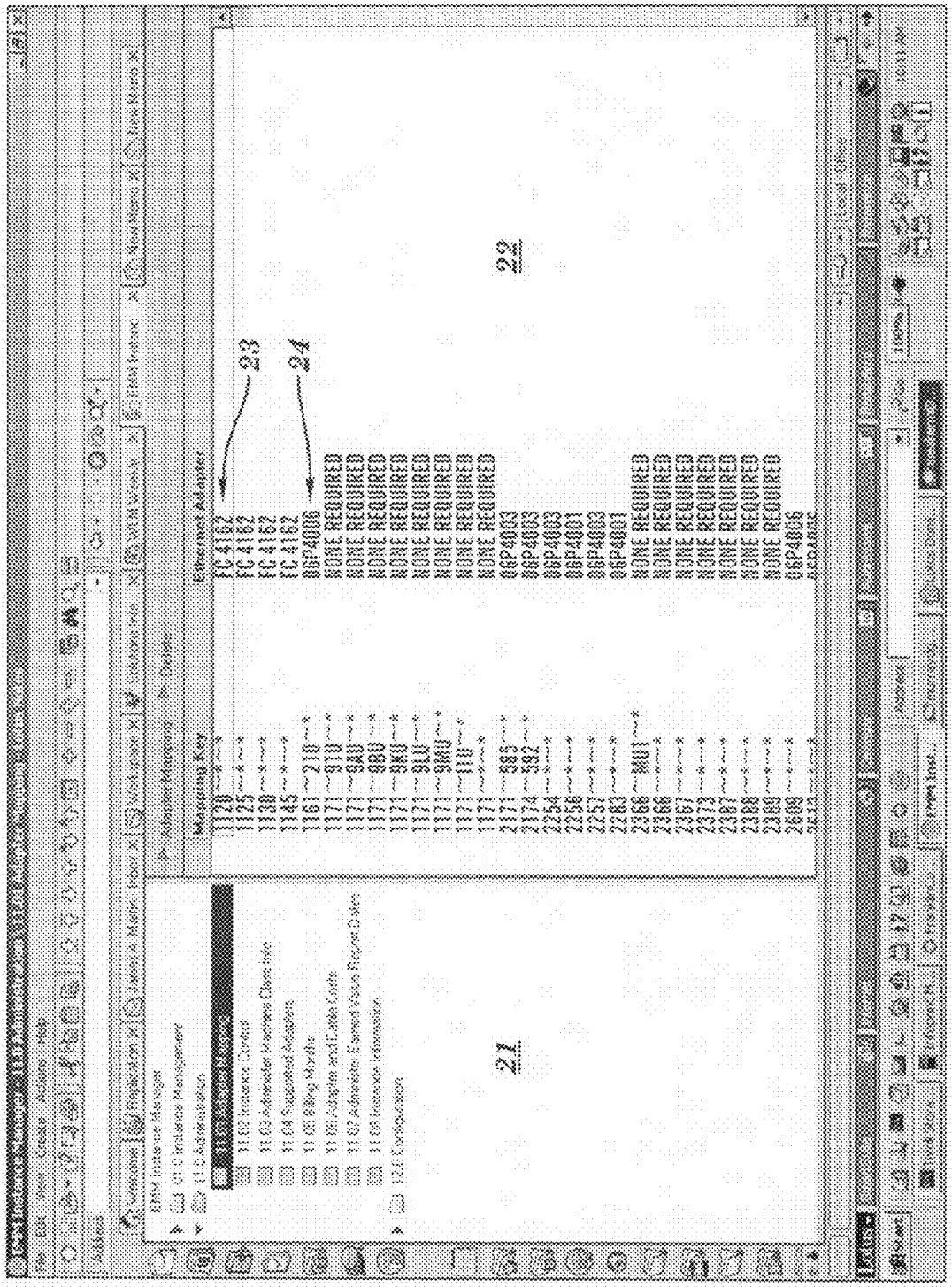
FIG. 2A is a screenshot depicting a view of rules associated with a rules hierarchy, in accordance with embodiments of the present invention.

FIG. 2A is a screenshot depicting a view 22 of rules associated with a rules hierarchy 21, in accordance with embodiments of the present invention. A "view" is a "virtual data structure" in which the data structure is represented in a visual form but is not physically stored in a database. The "virtual data structure" in the view 22 is a virtual table" having columns "Mapping Key" and "Ethernet Adapter", such that the view 22 has the visual appearance of a table even though said "table" does not actually exist as a table of database.

The documentations hierarchy 21 is a two-level hierarchy. The rules hierarchy 21 is a two-level hierarchy. The first level of the two-level rules hierarchy 21 has classification of: 01.0 Instance Management, 11.0 Administration, and 12.0 Configuration. The second level of the 11.0 Administration has classifications of: 11.01 Adapter Mapping, 11.02 Instance Control, 11.03 Administer Machine Class Info, 11.04 Supported Adapters, 11.05 Billing Months, 11.06 Adapter and Cable Costs, 11.07 Administer Earned Value Report Dates, and 11.08 Instance Information. The lowest level classifications of the rules hierarchy (e.g., the classifications 11.01-11.07 in FIG. 2A) are called "rules categories." Although the rules hierarchy 21 in FIG. 2A is a two-level hierarchy, the rules hierarchy of the present invention generally comprises one or more levels. Thus, the highlighting of "11.01 Adapter Mapping" in the view 21 triggers a display of the application rules in view 22 associated with the rules category of 11.01 Adapter Mapping.

The view of FIG. 2A displays the set of application rules in the view 22 associated with the rules category of 11.01 Adapter Mapping. As seen in FIG. 2A, the highlighting of "11.01 Adapter Mapping" in the rules hierarchy 21 triggers a display of the application rules in the view 22 associated with the rules category of 11.01 Adapter Mapping. These application rules in the view 22 identify whether a given machine (i.e., computer) needs to have an Ethernet Adapter installed therewithin. The application rules shown in the view 22 each specify the Ethernet Adapter to be installed as a function of the parameters denoted in the "Mapping Key," namely the parameters of machine type, machine model, machine class, wherein the ~ symbol is a separator between parameters and the * symbol is a wildcard for a parameter. For example, the application rule 23 shown in the view 22 is that the Ethernet Adapter is "FC4162" if the machine type is "1120" for all machine models and machine classes. As another example, the application rule 24 shown in the view 22 is that the Ethernet Adapter is "06P4006" if the machine type is "1161" and the machine model is "210" for all machine classes. The application rule "None Required" denotes that an Ethernet Adapter is not to be installed in the associated machine denoted in the Mapping Key.

Each rule category of FIG. 2A has its set of rules and the rules of the 11.01 Adapter Mapping was presented supra as a first illustration. As a second illustration of rules, the rules category of 11.05 Billing Months may include rules which define both the starting and ending dates for each billing month (versus calendar month). These starting and ending dates, denoted respectively as "Billing Start" and Billing End" for each billing month, may change from billing year to billing year, and these changes are to be propagated to all database instances to ensure timely and accurate billing based on the date a given service was performed or the date a piece of hardware was delivered. As an example, FIG. 2B is a table depicting rules for rules category 11.05 Billing Months for billing year 1904 and the first three months of billing year 2003, in accordance with embodiments of the present invention. Each row of the table of FIG. 3B is a rule of the rules category 11.05 Billing Months.

As a third illustration of rules, rules category of Machine Class (not listed in FIG. 2A) includes rules for centrally administering a valid list of machines usages, operating systems and network card types, etc. affiliated with a machine class. A machine class could be a Laptop, Desktop, Server, etc. FIG. 3C depicts a row of a table illustrating an exemplary rule for the Machine Class of Laptop, in accordance with embodiments of the present invention.

Figure 3:
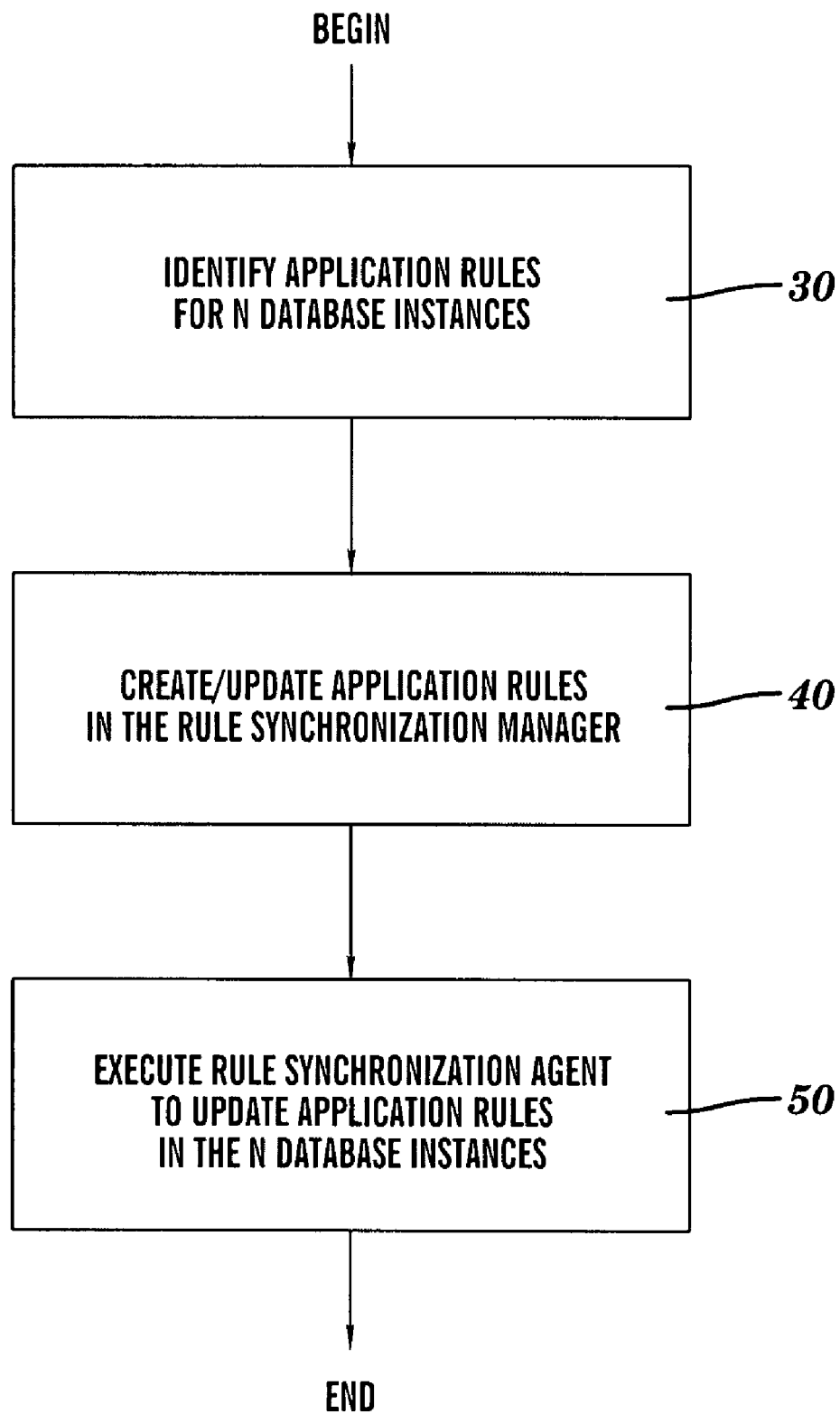
FIG. 3 is a high-level flow chart depicting creation/editing of application rules and updating of the application rules across the database instances of FIG. 1, in accordance with embodiments of the present invention.

FIG. 3 is a high-level flow chart depicting steps 30, 40, and 50 for the creation/editing of application rules and updating of the application rules across the N database instances of FIG. 1, in accordance with embodiments of the present invention.

In step 30, application rules intended to be stored in the N database instances of FIG. 1 are identified. The application rules identified in step 30 may be initial application rules to be stored in the N database instances, new application rules to be added to application rules already in existence, or modifications of application rules already in existence.

In step 40 which is executed after step 30, the application rules identified in step 30 are encoded into the rule synchronization manager 12 of FIG. 1, by creation for newly identified rules or by updating for modified versions of application rules already in existence. Step 40 is described in greater detail in the flow chart of FIG. 4, discussed infra.

In step 50 which is executed after step 40, the rule synchronization agent 14 of FIG. 1 updates the N database instances in accordance with the application rules in the rule synchronization manager 12 of FIG. 1. Step 50 is described in greater detail in the flow chart of FIG. 6, discussed infra.

Figure 4:
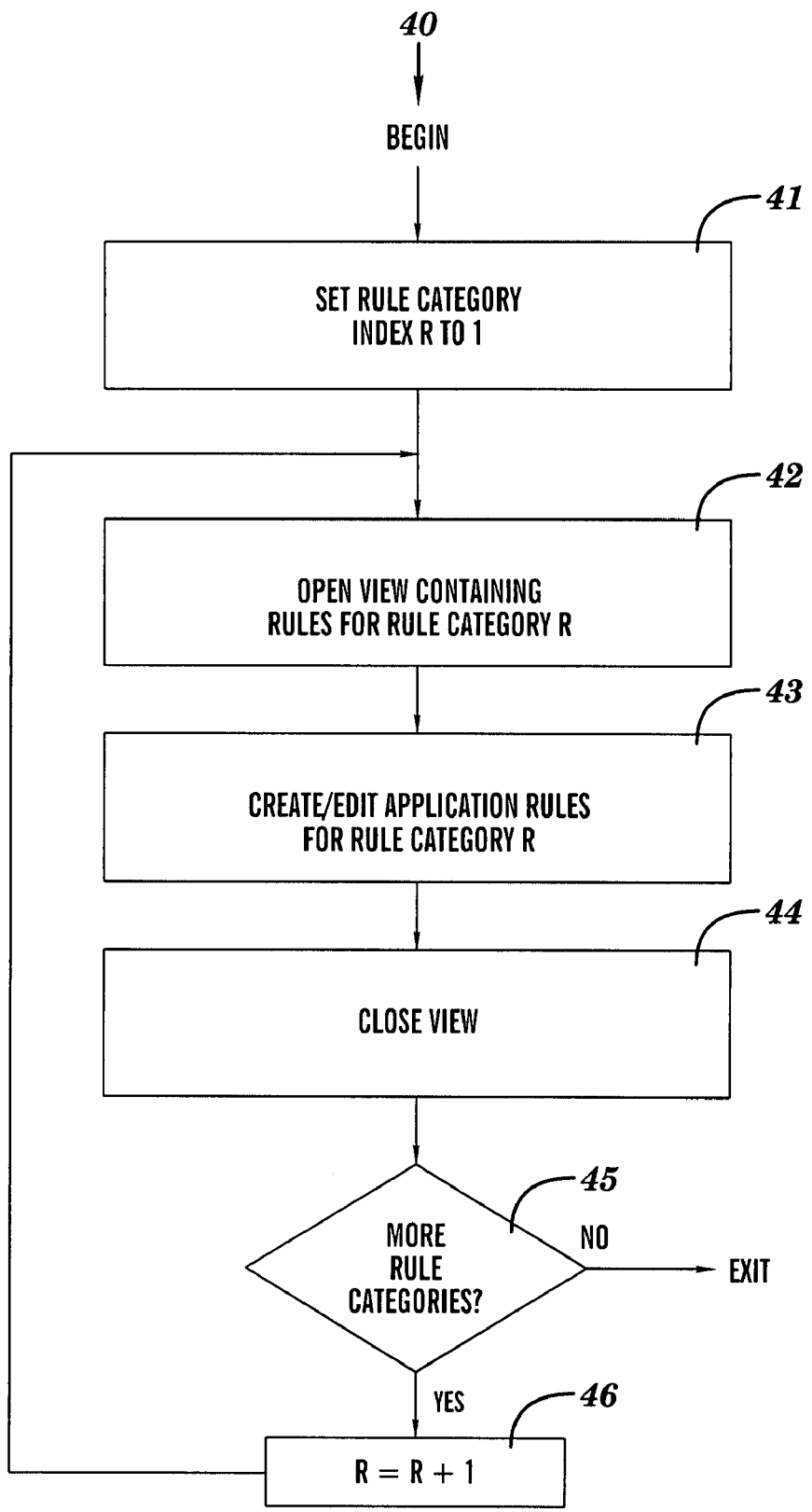
FIG. 4 is a flow chart depicting in greater detail the creation/editing of the application rules of FIG. 3, in accordance with embodiments of the present invention.

FIG. 4 is a flow chart depicting steps 41-46 which show step 40 of FIG. 3 in greater detail for the creation/editing of the application rules, in accordance with embodiments of the present invention.

Step 41 sets a rule category index R to 1, so as to initialize processing the first rule category to be processed. Associated with a rule category is a set of application rules (e.g., the application rules of the rule category 11.01 Adapter Mapping of FIG. 2A, described supra).

Step 42 opens a view containing a set of application rules for rule category R. FIG. 2A, described supra, is an example of such a view for the rule category 11.01 Adapter Mapping.

Figure 5:
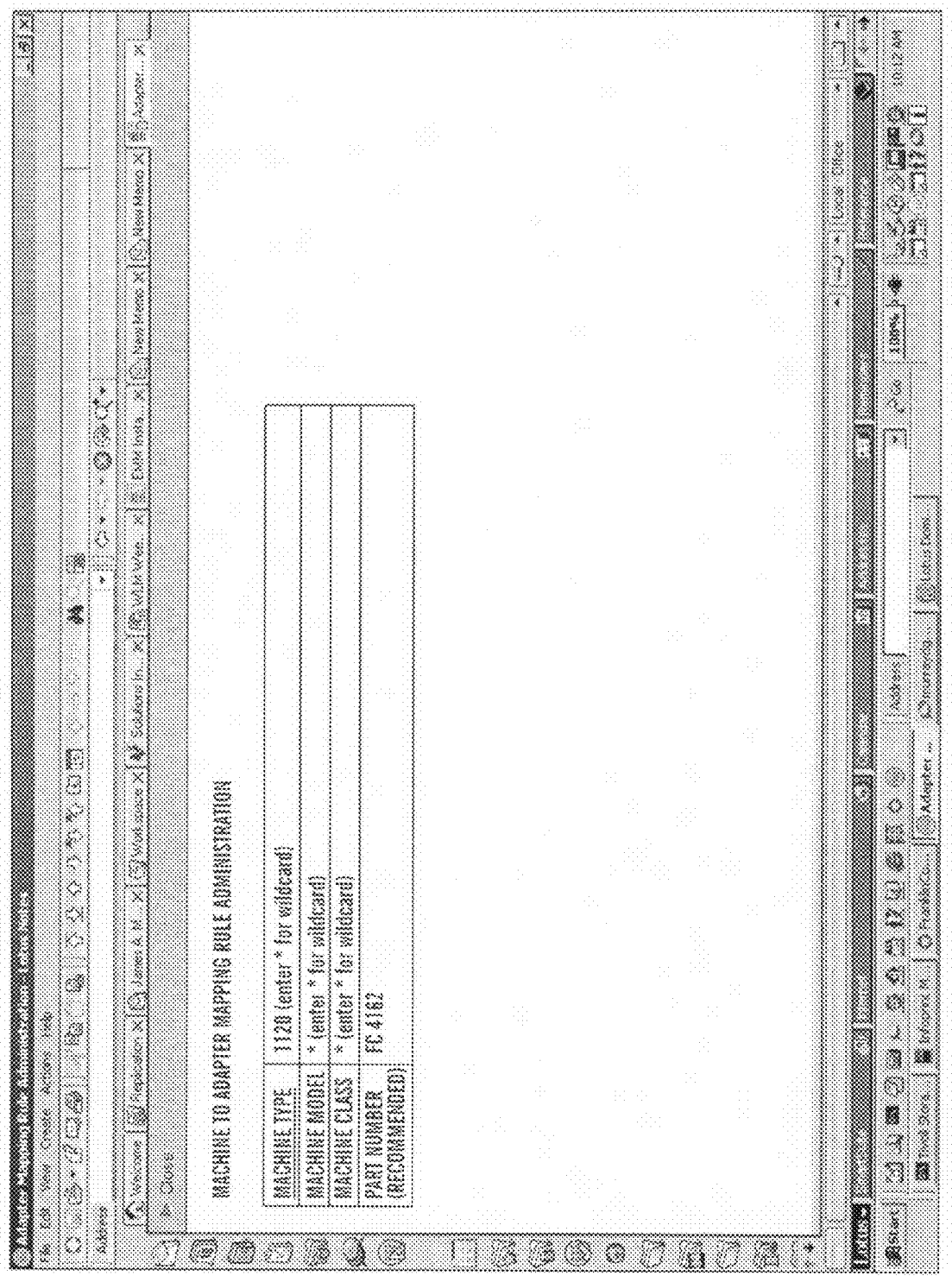
FIG. 5 is a screenshot depicting a view for the creation/editing of the application rules of FIG. 3, in accordance with embodiments of the present invention.

Step 43 is a create/edit step which may be performed either manually by an operator or in an automated fashion by software. For each rule of rule category R, step 43 creates and subsequently saves a rules document associated with the rule if the rule is a new rule. For each rule of rule category R, step 43 creates and subsequently saves a rules document associated with the rule if the rule already exists and is being modified. FIG. 5 is a screenshot depicting a view of such a rules document for the first rule of FIG. 2A (i.e., the rule for the machine type "1120"), in accordance with embodiments of the present invention.

Returning to FIG. 4, step 44 closes the view opened in step 42.

Step 45 determines whether there are any more rules categories to process. If there are no more rules categories to process, then the process of the flow chart of FIG. 4 is EXITed. If there are one or more rule categories yet to be processed, then the rule category index R is incremented by 1 in step 46 to step to the next rules category to be processed, and steps 42-46 are iteratively repeated until all rules categories have been processed.

Figure 6:
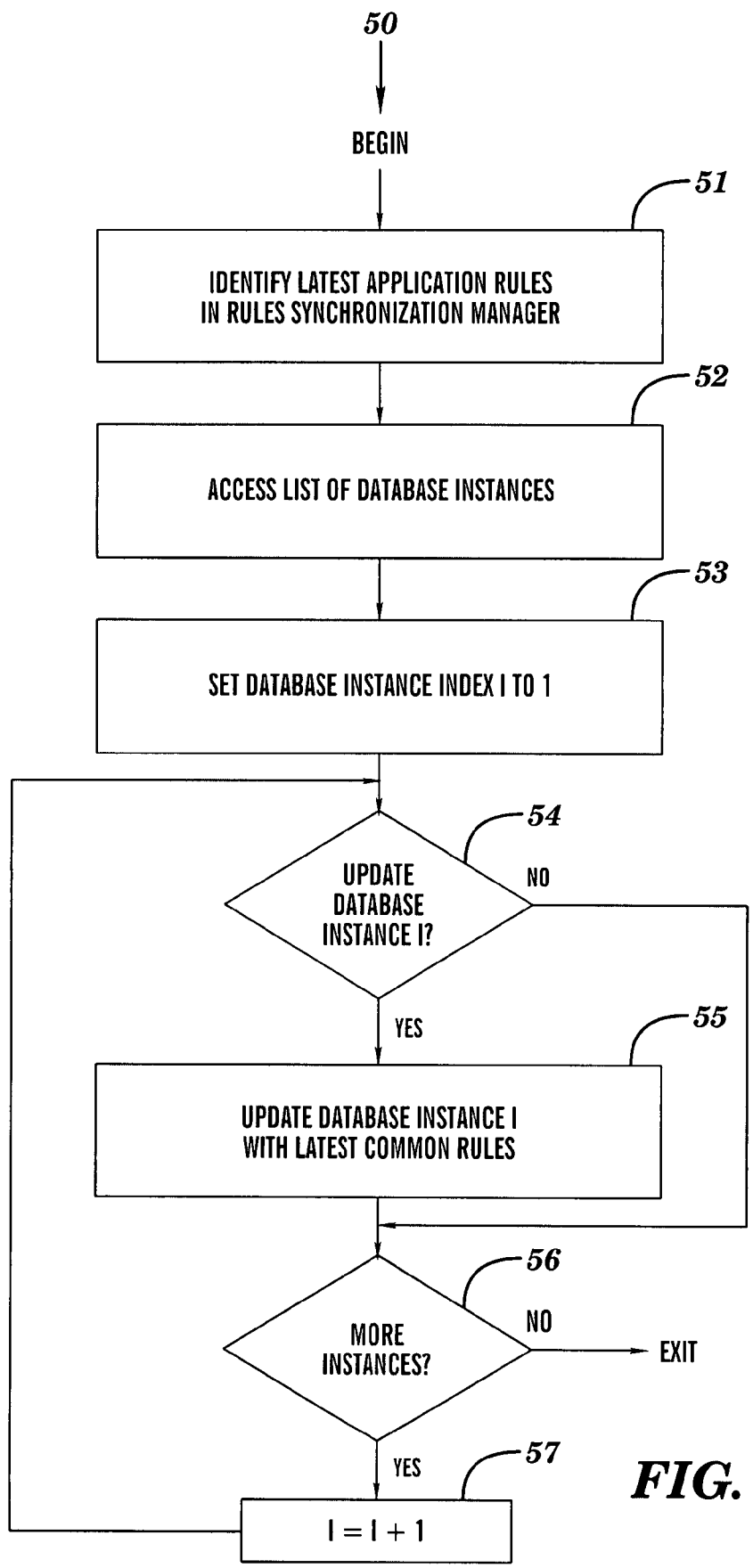
FIG. 6 is a flow chart depicting in greater detail the updating of the application rules across the database instances of FIG. 3, in accordance with embodiments of the present invention.

FIG. 6 is a flow chart depicting steps 51-57 which show step 50 of FIG. 3 in greater detail for executing the rule synchronization agent 14 of FIG. 1 to update application rules across the N database instances of FIG. 1, in accordance with embodiments of the present invention.

Step 51 identifies the latest (i.e., most recent) application rules in the rules synchronization manager 12 of FIG. 1. Assume that there are M such application rules, wherein M is at least 2.

Step 52 accesses a list of the N database instances.

Step 53 sets a database instance index I to 1, so as to initialize processing the first database instance of the N database instances to be potentially updated.

Step 54 determines whether to update database instance I with the M application rules, In an embodiment, the rule synchronization agent 14 of FIG. 1 always updates all database instance with the M application rules if it is possible to do so. However, it may be impossible to update database instance I with the M application rules. For example, the agent 14 may be unable to access the database instance I such as when the communication link to database instance I (e.g., one of the communication links 16-19 of FIG. 1) is disabled or when the database instance I is disabled. In another embodiment, database instance I will not be updated with the M application rules if the agent 14 determines that the database instance I already comprises the M application rules in the rules synchronization manager 12 of FIG. 1. For example, at a recent previous time when less than N database instances existed (e.g., N-K database instances existed such that K is at least 1), a comprehensive updating of all existing database instances was successfully accomplished including the updating of database instance I. For times following the recent previous time in this example, the application rules have not changed but K new database instances have been added, so that the current updating of the N database instances need update only the K new database instances with the M application rules. Thus in this example, it would be determined in step 54 not to update the database instance I with the M application rules if database instance I is one of the N-K database instances referred to supra.

If it is determined in step 54 to update database instance I with the M application rules, then database instance I is updated in step 55 with the M application rules identified in step 51, followed by execution of step 56. In an embodiment, step 55 may be implemented by deleting all existing application rules in database instance I and adding the M application rules identified in step 51 to database instance I. In another embodiment, step 56 may be implemented by keeping track of the status (i.e., version) of all existing application rules in database instance I and adding/changing only those application rules which do not already exist in the database instance I. If it is determined in step 54 not to update database instance I with the M application rules, then step 56 is next executed.

Step 56 determines whether there are more database instances to process (i.e., whether I is less than N). If it is determined in step 56 that there are no more database instances to process, then the process of the flow chart of FIG. 6 is EXITed. If it is determined in step 56 that there are more database instances to process (i.e., I is less than N), then the database index I is incremented by 1 in step 57 to step to the next database instance to process, and steps 54-57 are iteratively repeated until all database instances have been processed.

Based on the preceding description of the flow chart of FIG. 6, the execution of the rule synchronization agent 14 of FIG. 1 generally comprises updating N1 database instances of the N database instances with the M application rules and not updating the remaining N-N1 database instance that remains if N1 is less than N. N1 is at least 1. If N1 is less than N then each of the remaining N-N1 database instances may comprise at least one characteristic of a first characteristic and a second characteristic. The first characteristic is that the remaining N-N1 database instances comprise the M application rules upon initiation of the execution of the rule synchronization agent 14 in step 51. The second characteristic is that the rule synchronization agent 14 is unable to access the remaining N-N1 database instances while the agent 14 is being executed.

Figure 7:
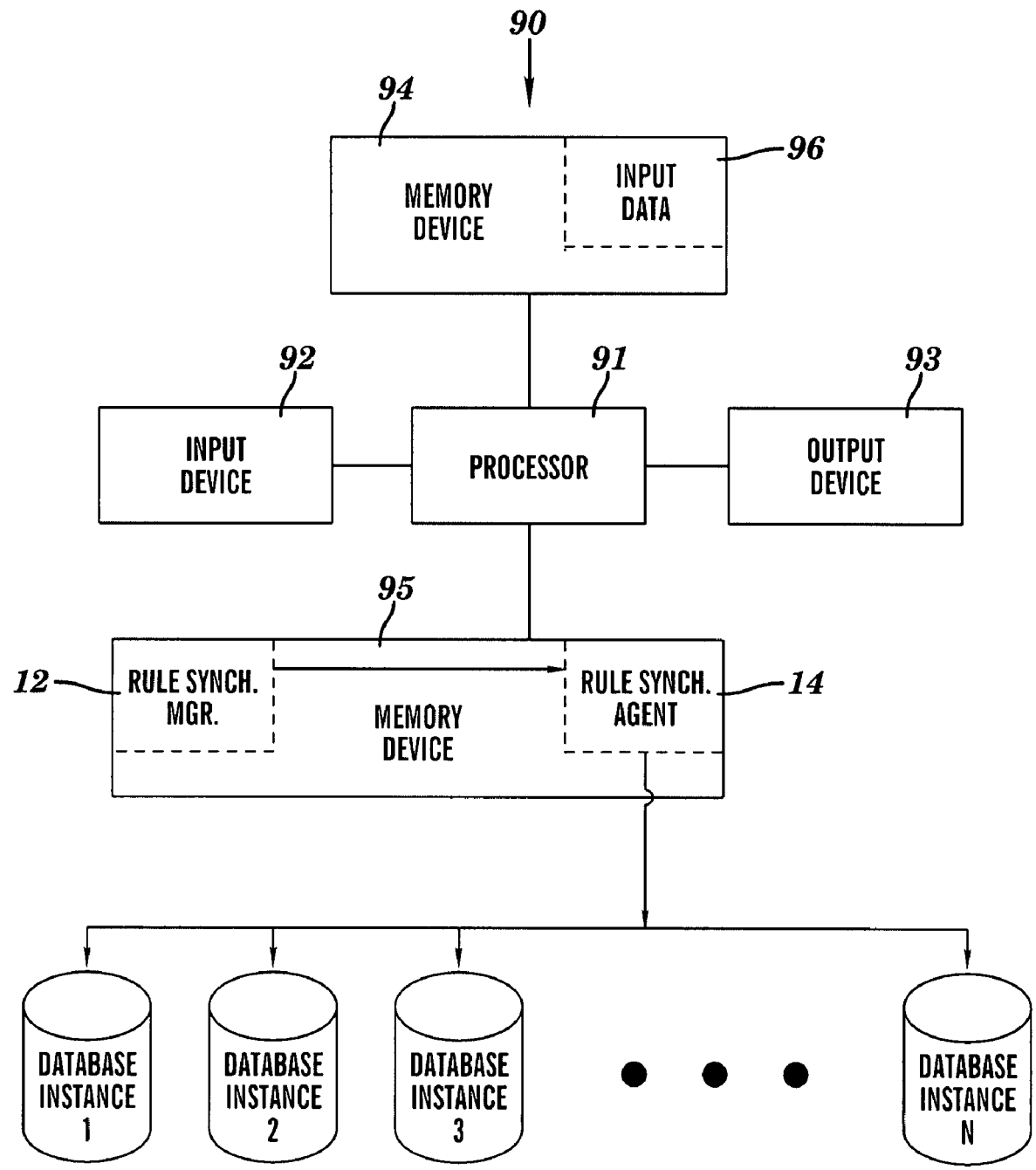
FIG. 7 depicts a computer system for managing and updating database instances having application rules, in accordance with embodiments of the present invention.

FIG. 7 depicts a computer system for managing and updating database instances having application rules, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 comprises a computer code which includes the rule synchronization agent 14 of FIG. 1 for managing and updating database instances having application rules. The memory device 95 further comprises the rule synchronization manager 12 of FIG. 1. In some embodiments as stated supra, the rule synchronization agent 14 may be comprised by the data structure of the rule synchronization manager 12. The processor 91 executes the rule synchronization agent 14. The memory device 94 includes input data 96. The input data 96 includes input required by the rule synchronization agent 14. The output device 93 displays output from the rule synchronization agent 14. Either or both memory devices 94 and 95 (or one or more additional memory devices not shown in FIG. 7) may be used as a computer usable medium (or a computer readable medium or a program storage device) having a computer readable program code embodied therein and/or having other data stored therein, wherein the computer readable program code comprises the computer code and the rule synchronization agent 14 therein. Generally, a computer program product (or, alternatively, an article of manufacture) of the computer system 90 may comprise said computer usable medium (or said program storage device).

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for synchronizing M application rules across N database instances, wherein each application rule is associated with a software application and is a value of a parameter expressed as a function of one or more additional parameters, said method comprising:

executing a rule synchronization agent, wherein said executing comprises updating N1 database instances of the N database instances with the M application rules and not updating the remaining N-N1 database instances that remains if N1 is less than N, wherein M is at least 2, wherein N is at least 2, wherein N1 is at least 1, wherein if N1 is less than N then each of the remaining N-N1 database instances comprise at least one characteristic of a first characteristic and a second characteristic, wherein the first characteristic is that the remaining database instances comprise the M application rules upon initiation of said executing, and wherein the second characteristic is that the rule synchronization agent is unable to access the remaining N-N1 database instances during said executing.

2. The method of claim 1, wherein N2 database instances of the N1 database instances comprises the M application rules upon initiation of said executing, and wherein N2 is at least 1.

3. The method of claim 1, wherein N1 is equal to N.

4. The method of claim 1, wherein N1 is less than N.

5. The method of claim 4, wherein at least one database instance of the remaining N-N1 database instances comprises the first characteristic.

6. The method of claim 4, wherein at least one database instance of the remaining N-N1 database instances comprises the second characteristic.

7. The method of claim 4, wherein at least one database instance of the remaining N-N1 database instances comprises the first characteristic and the second characteristic.

8. The method of claim 1, wherein the M application rules are distributed among a plurality of databases.

9. The method of claim 1, wherein the M application rules are all contained within a rule synchronizing manager such that the rule synchronizing manager is a single data structure.

10. The method of claim 9, wherein the rule synchronizing manager comprises the rule synchronization agent.

11. The method of claim 1, wherein the rule synchronization agent exists outside of the rule synchronization manager.

12. The method of claim 1, wherein each database instance of the N database instances comprise a same structural design.

13. The method of claim 12, wherein the same structural design may comprise a defined set of tables which includes a specification of the structured format of each table.

14. The method of claim 12, wherein the N database instances comprise different data values within a framework of the same structural design.

15. The method of claim 1, wherein the second characteristic is that the rule synchronization agent is unable to access the remaining N-N1 database instances during said executing due the remaining N-N1 database instances being disabled or due to communication links between the rule synchronization agent and the remaining N-N1 database instances being disabled.

16. The method of claim 1, wherein the second characteristic is that the rule synchronization agent is unable to access the remaining N-N1 database instances during said executing due to the remaining N-N1 database instances being disabled.

17. The method of claim 1, wherein the second characteristic is that the rule synchronization agent is unable to access the remaining N-N1 database instances during said executing due to communication links between the rule synchronization agent and the remaining N-N1 database instances being disabled.

18. A computer system comprising a processor and a computer readable memory unit coupled to the processor, said memory unit comprising computer readable program code that when executed by the processor implements the method of claim 1.

19. A computer program product, comprising a computer readable storage medium having a computer readable program code stored therein, said computer readable program code configured to implement the method of claim 1.

* * * * *